UNITED STATES PATENT OFFICE.

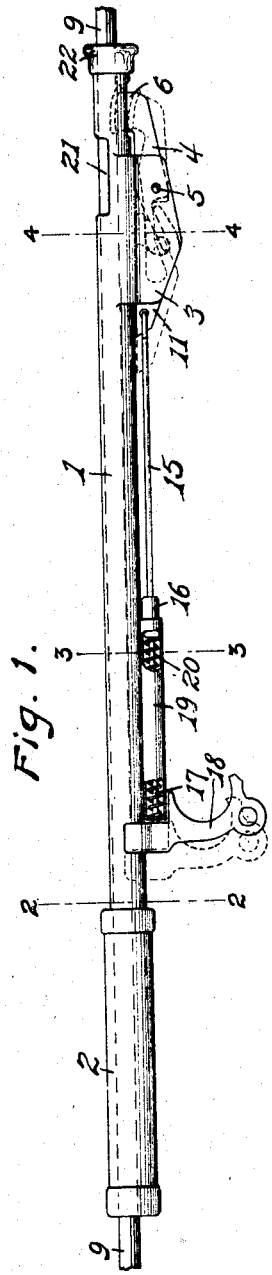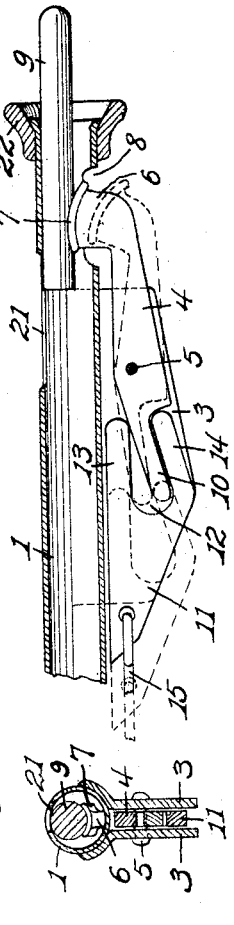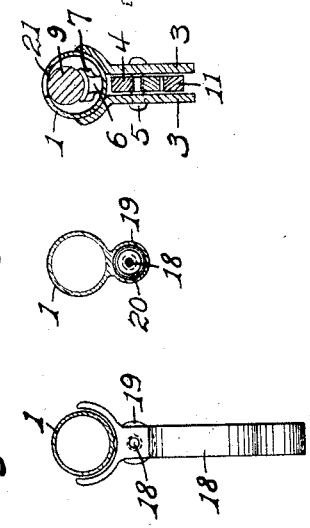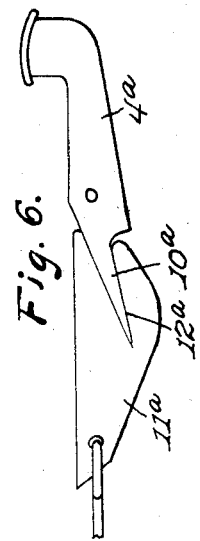

JOHN RICE, OF SALINEVILLE, OHIO.

WELDING-ROD HOLDER.

1,377,792.   Specification of Letters Patent.   Patented May 10, 1921.

Application filed July 24, 1919. Serial No. 312,950.

*To all whom it may concern:*

Be it known that I, JOHN RICE, a citizen of the United States of America, and resident of Salineville, county of Columbiana, and State of Ohio, have invented certain new and useful Improvements in Welding-Rod Holders, of which the following is a specification.

This invention relates to holders for welding-rods, and more particularly to a device whereby welding-rods may be held during the operation of welding.

The primary object of the invention is to provide a simple and convenient tool whereby the welding rods employed in oxy-acetylene welding may be held and fed forward as used without exposing the hand of the welder to the intense heat to which it is subjected in welding under present methods.

A further object is to provide a tool of the character mentioned within which any length of welding rod may be telescopically supported and advanced, or fed outward, as required until wholly used up, thus obviating the waste of material resulting from present methods in which a short length of each rod is left due to the fact that it is impracticable to hold it.

A still further object is to provide a welding-rod holder which can readily be handled and by which the advance of the rod can be effected with the use of but one hand, leaving the other hand free to handle the torch.

Another object is to provide a tool of the character mentioned having a tip of copper or other like material which will readily withstand, without melting, the heat to which it is subjected in making welds, and to which the welding flux which splashes thereon will not readily adhere.

With these and other objects in view, the invention resides in the features of construction, arrangement of parts and combinations of elements which will hereinafter be fully described, reference being had to the accompanying drawings, in which—

Figure 1 is a side elevation of the invention;

Figs. 2, 3 and 4 are enlarged cross sections taken on lines 2—2, 3—3 and 4—4, respectively;

Fig. 5 is an enlarged longitudinal section of the front end of the tool; and

Fig. 6 is a detail view showing a modified form of rod-gripping lever and lever-shifting device.

Referring to said drawings, in which like designating characters distinguish like parts throughout the several views—

1 indicates a tubular barrel having a fixed ferrule-like handle 2 on its rear end whereby it may be supported by hand. The bore of said barrel is made of sufficient diameter to receive therein any of a plurality of sizes of welding rods, as from one-sixteenth inch to one-half inch, and, because said bore extends throughout the entire length of said barrel, not only may any length of welding rod be used, but also a rod materially longer than the tool may be supported with its front end projecting from the front end of the barrel any distance desired by the user.

Welded or otherwise rigidly mounted upon the barrel somewhat rearward of its front end are two vertically depending parallel brackets 3 between which is received the body portion of a longitudinally disposed lever 4 which is pivotally supported by said brackets, as upon a pivot-pin 5. The front portion of said lever projects forward from between said brackets and has an upwardly extending end 6 surmounted by a suitable form of jaw 7. In the normal working position of the lever 4, the upright end 6 thereof protrudes through an opening 8 provided therefor in the under side of the barrel 1, and the jaw 7 lies in underlying supporting relation to a welding-rod 9 disposed within said barrel.

The rear end of said lever is shaped to form a tail-piece 10 which, in the said normal position of the lever, has a slight downward inclination, as shown. Also disposed between said brackets 3 is a longitudinally movable yoke 11 by movement of which said lever is actuated to move to and from its operative position. Said shifter yoke has in its front end a crotch-like opening or slot 12 within which is received the tail-piece 10 of the lever 4. Said crotch 12 gradually increases in width from the front end to the rear end thereof, as shown in Fig. 5, and separates two arms 13 and 14 which have their front ends respectively engaging the upper and lower edges of the tail-piece 10. As is obvious, when the shifter yoke 11 occupies its normal advanced position, as shown in full lines in Fig. 5, the arm 13 thereof rests upon the upper edge of the tail-piece 10, depressing the latter and, consequently, holding the lever 4 in a position wherein its jaw 7 is elevated into supporting relation to the welding rod 9 within the barrel. As said yoke is withdrawn in a rearward direction the lever is gradually swung on its pivot, the tail-piece 10 being elevated by the arm 14 of the yoke, until the parts assume the dotted line position indicated in said figure, wherein the jaw 7 is withdrawn from the barrel.

In the modification illustrated in Fig. 6, the tail-piece 10ª of the lever 4ª is of V-shape and is received within a correspondingly shaped downwardly and rearwardly inclined recess or crotch 12ª provided in the shifter yoke 11ª. Obviously, longitudinal movement of said shifter yoke 11ª actuates the lever 4ª in a manner identical with that of the shifter yoke 11 in the above-described structure.

Connected to the rear end of the shifter yoke is the front end of a rod 15 which lies parallel to the barrel 1 and is attached at its rear end to the head 16 of a rod or stem 17 which is disposed in alinement therewith and which is attached at its rear end to a trigger-like arm 18 that is located conveniently adjacent to the handle 2 by which the tool is held. Said stem 17 is longitudinally movable through a tubular casing 19 which is fixed upon the under side of the barrel in front of the trigger 18. Disposed within said casing 19 in encircling relation to said stem 17 is a spiral compression spring 20 the rear end of which rests against the rear end of said casing and the front end of which is seated against the head 16 of said stem. Said spring exerts a tension whereby the rod 15 and yoke 11 are normally held in forwardly thrust positions for maintaining the lever 4 in its operative position. When it is desired to withdraw the jaw 7 of the lever from the barrel, as for releasing a welding-rod, or for allowing a welding rod to be introduced in the barrel, the trigger 18 is retracted by rearwardly applied force exerted by a finger of the hand which grasps the handle 2. This action effects retraction, against the tension of the spring 20, of the movable parts connected to said trigger. Immediately following release of the trigger, the said parts are actuated by said spring to resume their normal positions wherein the welding rod is securely gripped between the jaw 7 and the upper wall of the barrel.

Since the welding rod is gripped closely adjacent to the front end of the barrel, it is apparent that it may be used up to a point where but little, if any, more than an inch thereof remains. Ordinarily, this remaining short length may be used up by dropping it from the holder on or into the pocket of the weld.

A slot or sight opening 21 is preferably provided in the barrel at a suitable point adjacent to the front end of the latter, through which the welder may observe the length of the welding rod when the latter has been used up to a point near its end.

Rigidly mounted upon the front end of the barrel is a flaring collar-like tip 22 composed of copper or other material to which the welding flux which splashes thereagainst during the welding operation will not readily adhere.

While I have herein described the invention more or less in detail, it will be understood that various changes may be made in the construction and arrangement of some of the parts without departing from the spirit or scope of the invention as defined in the appended claims.

What is claimed is—

1. A welding-rod holder comprising a tubular barrel having a uniform bore throughout and adapted to receive and feed a welding-rod therethrough, means movable through a side of the barrel adjacent to the front end of the latter for exerting a gripping pressure on a welding-rod, slidable means spring-pressed in an advanced position whereby said gripping means is normally held in operative position, and means operable by the hand which supports the barrel whereby retraction of said holding means may be effected for withdrawing said gripping means.

2. A welding-rod holder comprising a tubular barrel adapted to receive and feed a welding-rod therethrough, means movable through a side of the barrel adjacent to the front end of the latter for exerting a gripping pressure on a welding rod, longitudinally shiftable means coöperating with said gripping means and movable relative to the latter, said shiftable means being adapted in advanced position to hold the latter in operative position and in retracted position to hold the same withdrawn in inoperative position, yieldable means normally holding said shiftable means advanced, and means connected to said shiftable means and operable from a point adjacent to the rear end of said barrel whereby said shiftable means may be retracted against the tension of said yieldable means.

3. A welding-rod holder comprising a tubular barrel having a handle at its rear end, said barrel being adapted to receive and feed a welding-rod therethrough, a lever pivoted at a fixed point outside the bore of said barrel and having a jaw operable through a side of the barrel adjacent to the front end of the latter for exerting a gripping pressure upon a welding rod whereby the latter is held in adjusted position, means coöperating with said lever for holding the latter in gripping position and movable to a position wherein it effects shifting of said lever for withdrawing said jaw from said barrel, yieldable means whereby said lever shifting means is normally held in operative position, and means located adjacent to said handle whereby said lever shifting means may be actuated against the tension of said yieldable means.

4. A welding-rod holder comprising a tubular barrel having a handle at its rear end, said barrel being adapted to receive and feed a welding-rod therethrough, a lever pivoted at a fixed point outside the bore of said barrel and having a jaw operable through a side of the barrel adjacent to the front end of the latter for exerting a gripping pressure upon a welding rod whereby the latter is held in adjusted position, an inclined tail-piece carried by said lever, a shiftable yoke having members engaging the upper and lower edges of said tail-piece, tension means normally holding said yoke in an advanced position wherein the upper member thereof exerts a force upon said tail-piece for holding the lever in its operative position, and means for retracting said yoke against said tension means for causing the lower member of said yoke to elevate said tail-piece for rendering said lever inactive.

5. A welding-rod holder comprising a tubular barrel adapted to receive and feed a welding-rod therethrough, means for holding a rod in adjusted position in said barrel, and an outwardly flared collar-like tip carried upon the front end of said barrel, said tip being composed of a material to which welding flux will not readily adhere.

In testimony whereof, I affix my signature in presence of two subscribing witnesses.

JOHN RICE.

Witnesses:
MYRON C. HILEMAN,
ELMER E. BLACK.